(12) United States Patent
Deal

(10) Patent No.: US 8,770,242 B2
(45) Date of Patent: Jul. 8, 2014

(54) TIRE WITH ANNULAR BAND AND SUPPORTING STRUCTURE

(75) Inventor: Michel Deal, St-Remy-En Rollat (FR)

(73) Assignees: Michelin Recherche et Technique S.A., Granges-Paccot (CH); Compagnie Generale des Etablissements Michelin, Clemont-Ferrand (FR)

( * ) Notice: Subject to any disclaimer, the term of this patent is extended or adjusted under 35 U.S.C. 154(b) by 408 days.

(21) Appl. No.: 12/738,272

(22) PCT Filed: Oct. 10, 2008

(86) PCT No.: PCT/FR2008/001428
§ 371 (c)(1),
(2), (4) Date: Aug. 16, 2010

(87) PCT Pub. No.: WO2009/087291
PCT Pub. Date: Jul. 16, 2009

(65) Prior Publication Data
US 2010/0319828 A1 Dec. 23, 2010

(30) Foreign Application Priority Data
Oct. 15, 2007 (FR) .................................... 07 07218

(51) Int. Cl.
*B60C 7/12* (2006.01)
*B60C 5/24* (2006.01)

(52) U.S. Cl.
USPC ....................... 152/333.1; 152/331.1; 152/453

(58) Field of Classification Search
USPC ............................ 152/331.1, 333.1, 453, 510
IPC .................................................. B60C 5/24,7/12
See application file for complete search history.

(56) References Cited

U.S. PATENT DOCUMENTS

| | | | | |
|---|---|---|---|---|
| 2,909,208 A * | 10/1959 | Sebreny | ........................ | 152/327 |
| 3,822,732 A * | 7/1974 | Ferguson et al. | ................. | 152/7 |
| 4,169,494 A * | 10/1979 | Kubica et al. | ................. | 152/310 |
| 4,235,270 A | 11/1980 | Kahaner et al. | | |
| 4,603,721 A * | 8/1986 | Kogure et al. | ............. | 152/209.5 |
| 5,073,444 A * | 12/1991 | Shanelec | .................... | 428/313.5 |
| 5,265,659 A * | 11/1993 | Pajtas et al. | ................... | 152/329 |
| 2005/0257869 A1 * | 11/2005 | Rumbaugh | ................... | 152/153 |

FOREIGN PATENT DOCUMENTS

JP 2007 118913 5/2007
JP 2007 238019 9/2007

* cited by examiner

*Primary Examiner* — Justin Fischer
*Assistant Examiner* — Philip N Schwartz
(74) *Attorney, Agent, or Firm* — Cozen O'Connor

(57) ABSTRACT

A tire comprising an envelope made at least partly of rubber, defining an internal annular volume and having a crown (1), which defines a tread, two sidewalls (2) joined to the crown (1), and a supporting structure (4). The supporting structure (4) is pressurized and divides the annular volume of the tire into a plurality of compartments (400) or cells, and the sidewalls (2) are connected to or integral with the supporting structure (4).

2 Claims, 8 Drawing Sheets

TIRE WITH ANNULAR BAND AND SUPPORTING STRUCTURE

RELATED APPLICATION

This is a U.S. National Phase Application under 35 USC §371 of International Application PCT/FR2008/001428 filed on Oct. 10, 2008.

This patent application claims the priority of French patent application no. 07/07218 filed Oct. 15, 2007, the disclosure content of which is hereby incorporated by reference.

FIELD OF THE INVENTION

The invention relates in general terms to equipment for motor vehicles.

More specifically, the invention relates to a tire comprising an envelope made at least partly of rubber, defining an internal annular volume which is subjected in operation to an inflation pressure and has a crown and two sidewalls, the crown being joined to each of the two sidewalls and defining a tread, this tire also comprising at least one inner annular band, an outer annular band and a supporting structure, the inner annular band being arranged concentrically inside of and at a distance from the crown, the outer annular band belonging to the crown of the tire, and the supporting structure being housed at least partially inside the internal volume and connecting together the outer annular band and the inner annular band.

BACKGROUND OF THE INVENTION

A tire of this kind is described for example in U.S. Pat. No. 4,235,270.

In a traditional tire, the function of the sidewalls is both to transmit to the wheel rim the forces exerted by the ground on the tread, and to steer the latter.

Although the supporting structure of a tire as described in U.S. Pat. No. 4,235,270 cooperates with the sidewalls of this tire to transmit the forces between the inner and outer annular bands, this massive structure necessarily also affects and to a significant degree, the steering of the tread.

The constraints associated with this dual function are such that, during the tire design phase, complex compromises must be arrived at, notably in terms of weight, structural complexity, maximum transmissible torque, and tire deformations, which cause internal heating.

SUMMARY OF THE INVENTION

Against this background, it is an object of the invention to provide a tire having a structure that lessens the severity of these constraints.

To this end, a tire such as described above includes supporting structure that is pressurized by the inflation pressure and divides the annular volume of the tire into a plurality of compartments or cells, and has sidewalls that are connected to or integral with the supporting structure.

With this arrangement, the supporting structure is stiffened by the internal pressure of the tire and can therefore essentially be realized by thin, lightweight walls.

The outer annular band is advantageously formed of a continuous annular sheet to which rubber blocks forming the tread are stuck.

In one possible embodiment, the inner annular band and outer annular band are airtight and the sidewalls are farmed of lateral walls joined in an airtight manner to the outer and inner annular bands in order to define said annular volume in an airtight manner.

Each annular band may consist of a continuous annular sheet made of metal of a metal alloy, and in particular they may be made of a material from the group comprising stainless steel and an aluminium alloy.

The supporting structure comprises for example a plurality of radial partition walls which divide the annular volume into a plurality of compartments that succeed one another in a direction tangential to the tire.

In a variant, the supporting structure may also comprise a plurality of internal walls that divide the annular volume into a plurality of honeycomb cells juxtaposed in both a tangential direction and a radial direction of the tire.

Regardless of what embodiment is selected, it may be wise to have at least some of said cells airtight with respect to the other cells.

BRIEF DESCRIPTION OF THE DRAWINGS

Other features and advantages of the invention will be made clear in the course of the following description given by way of indication without implying any limitation, with reference to the appended drawings, in which.

DETAILED DESCRIPTION OF THE DRAWINGS

Figure 1:
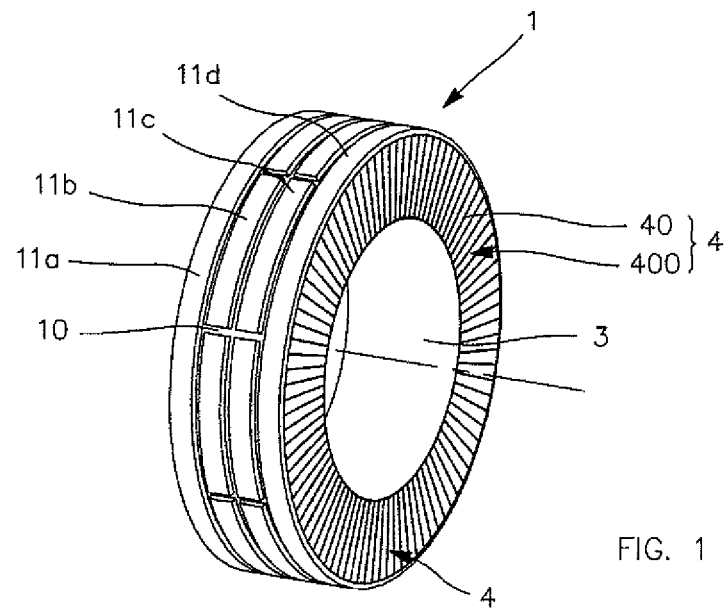
FIG. 1 is a partial perspective view of a tire in a first possible embodiment of the invention.
Figure 2:
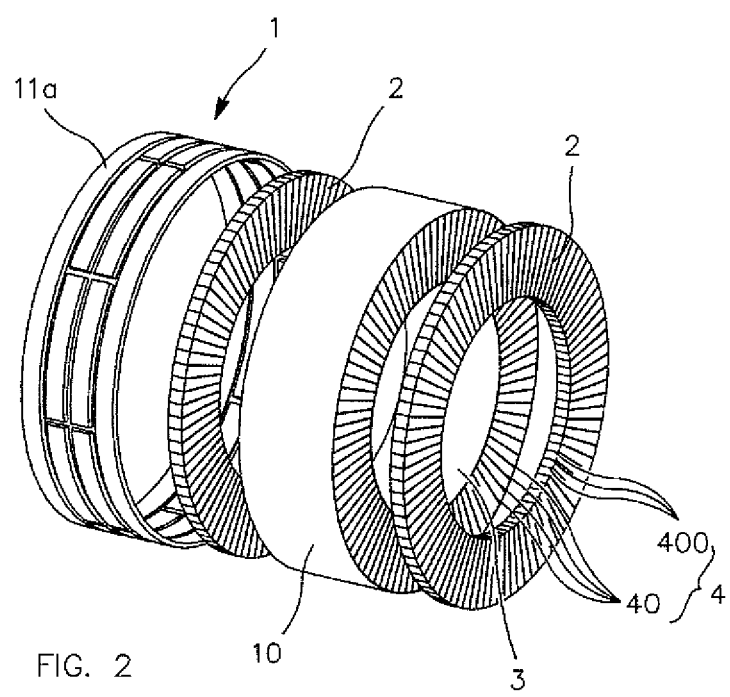
FIG. 2 is an exploded perspective view of the tire in the first embodiment.

As pointed out earlier, the invention relates to a tire considered essentially from the point of view of its structure.

A tire in accordance with an embodiment of the invention comprises an envelope made at least partially of rubber, which defines, in an airtight manner, an internal annular volume V (FIG. 3) and which has a crown 1 and two sidewalls 2.

The crown 1 is joined to each of the two sidewalls 2 and defines on its outer face a tread.

The tire also comprises at least one inner annular band 3, an outer annular band 10, and a supporting structure 4.

The inner annular band 3 is arranged concentrically with inside of and at a distance from the crown 1, while the supporting structure 4 is housed at least partially inside the internal volume V and connects the inner annular band 3 to the outer annular band 10, which is an integral part of the crown 1.

When the tire is in use, the annular volume V defined by the annular bands 3 and 10 and by the sidewalls 2 is airtight and pressurised—that is, is subjected to an internal air pressure greater than atmospheric, known as the inflation pressure.

The supporting structure 4 is pressurized by the inflation pressure and divides the annular volume of the tire into a plurality of elementary volumes which will be referred to in this text as compartments or cells depending on their shape.

In addition, the sidewalls 2 are connected to the supporting structure 4 or integrated into this supporting structure.

Figure 3:
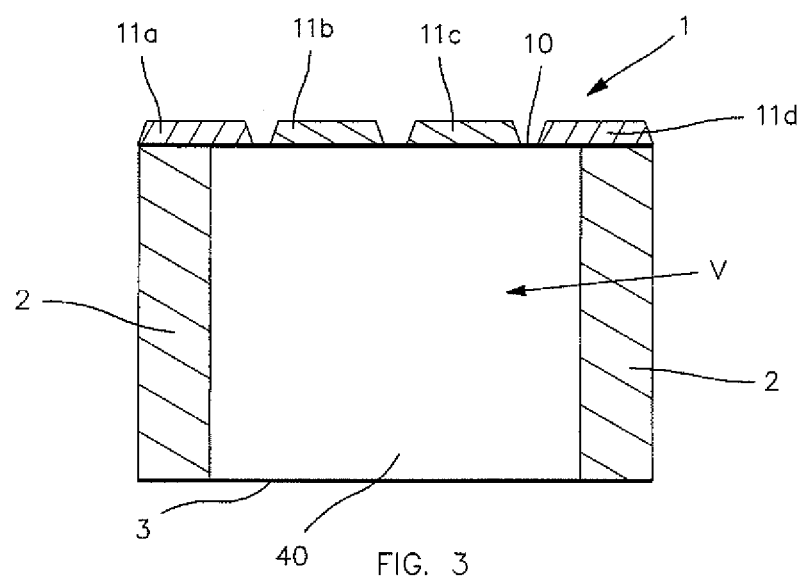
FIG. 3 is a radial cross section through the tire illustrated in FIG. 2.
Figure 12:
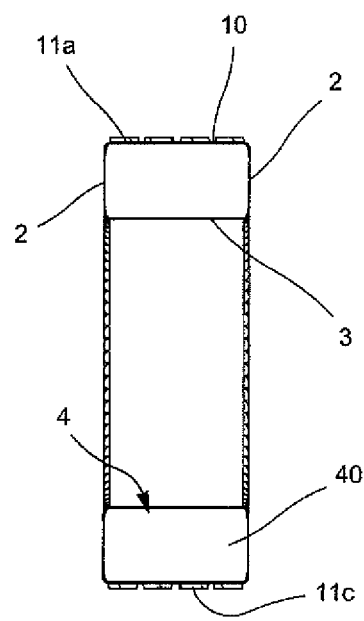
FIG. 12 is a radial cross section through the tire illustrated in FIG. 11.
Figure 13:
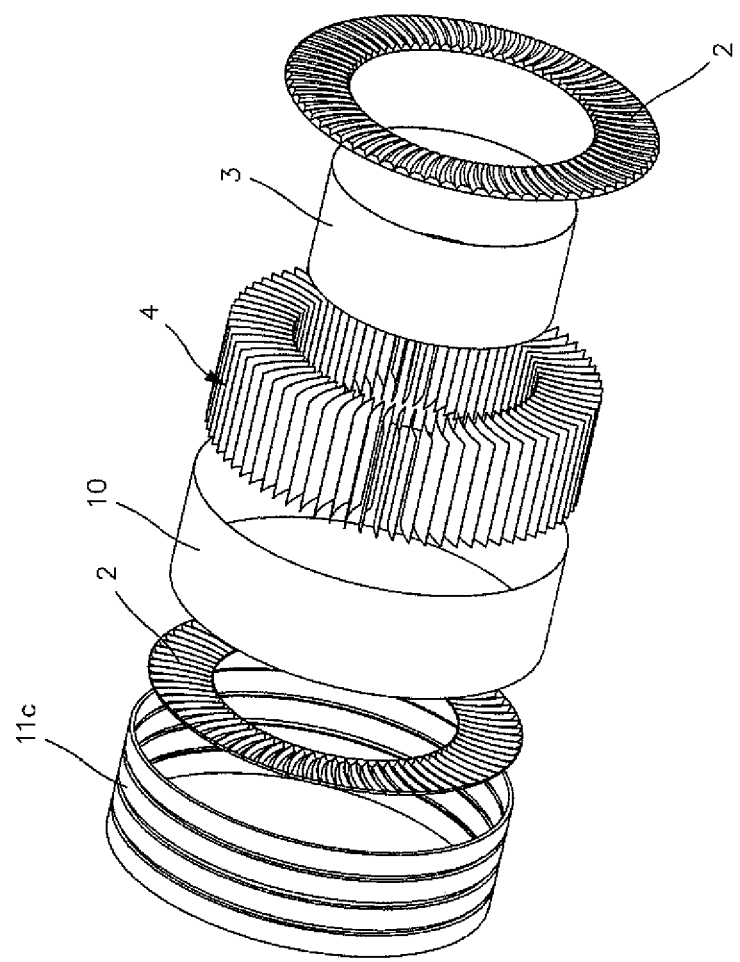
FIG. 13 is an exploded perspective view of the tire in the fourth possible embodiment of the invention.

Preferably, and as FIGS. 3 and 12 show, the outer annular band 10 is formed by a continuous annular sheet to which rubber blocks such as 11*a*, 11*b*, 11*c*, and 11*d* are stuck to form the tread 1.

Both the inner 3 and outer 10 annular bands are therefore advantageously airtight and are joined in an airtight manner to two airtight lateral walls forming the sidewalls 2.

Each of the annular bands 3 and 10 may in particular consist of a continuous annular sheet of metal or a metal alloy, such as stainless steel or an aluminium alloy.

Figure 4:
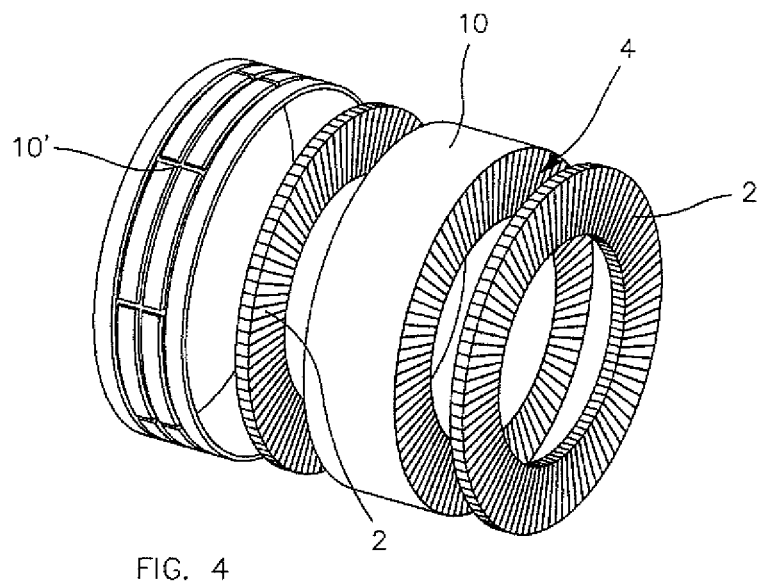
FIG. 4 is a perspective view of a variant of the tire illustrated in FIG. 2.
Figure 5:
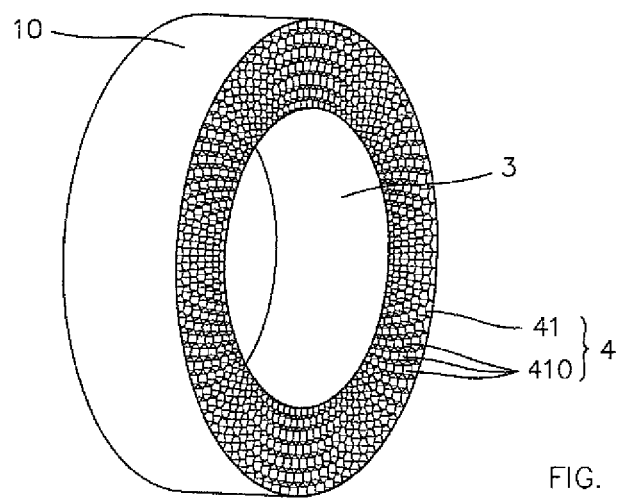
FIG. 5 is a partial perspective view of a tire in a second possible embodiment of the invention.

In the embodiment shown in FIG. 4, the tire comprises an outer annular band 10 of this kind which is itself covered by a supplementary annular band 10' carrying the rubber blocks of the tread 1.

Whatever the number of outer annular bands may be, the supporting structure 4 divides the annular volume V into a plurality of compartments 400 or cells 410 which collectively are airtight relative to the environment around the tire, and at least some of which may be airtight with respect to other compartments or cells.

Figure 14:
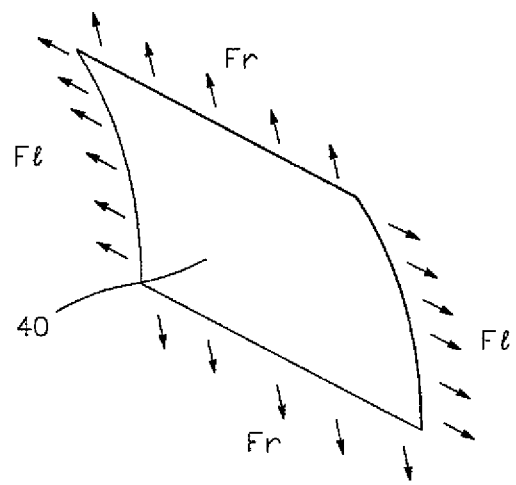
FIG. 14 is an enlarged perspective view of an element of the supporting structure of the tire illustrated in FIG. 13.

In the embodiments illustrated in FIGS. 4, 11 to 13 and 15, the supporting structure 4 comprises a plurality of partition walls 40, one of which is illustrated in FIG. 14.

These partition walls 40, which adopt a radial or practically radial position, divide the annular volume V up into a plurality of compartments 400 which succeed one another in a direction which locally is tangential relative to the tire and globally follows the circumference of this tire.

In the embodiment illustrated in FIGS. 5 to 10, the supporting structure 4 comprises a plurality of internal walls 41 which divide the annular volume V of the tire into a plurality of honeycomb cells 410.

These cells are juxtaposed both in a tangential direction and a radial direction of the tire, each cell thus extending in a direction parallel to the tire axis.

The supporting structure 4 can be made by injection moulding or extrusion.

The inner annular band 3 is preferably mounted on an essentially cylindrical wheel rim or hub by a reversible connection.

The outer annular band 10 is preferably tensioned by the pressure of the gas contained in the annular volume V of the tire.

The lateral walls 2 may for example be made of a closed-cell foam bonded to the inner 3 and outer 10 annular bands, as well as to each of the radial partition walls 40.

The structure 4, which is housed between the sidewalls 2 thus serves to reinforce the foam by containing it within the walls formed by the annular bands 3 and 10 and the partition walls 40 or the inner walls 41.

Like the cells 410, the compartments 400 may or may not be designed to communicate with each other.

On the other hand, it is wise to maintain an aspect ratio between the width of the sidewalls 2 and the maximum distance between the walls of the cells or of the compartments containing the foam, as a function of the inflation pressure and the foam density, in order to ensure that this foam does not become extruded.

Typically, in the case of the embodiment shown in FIG. 4, for an inflation pressure of 2 bar and a foam with a relative density of 0.1, a suitable aspect ratio can be obtained by giving the width of the sidewall 2 a value greater than 20 mm, and adopting a maximum distance between walls of less than 15 mm, corresponding in this case to the maximum spacing between the partition walls 40.

In the embodiment illustrated in FIGS. 7 to 10, the pressurised supporting structure 4 is an assembly of two shells 4A and 4B which are approximately symmetrical with respect to the plane of the wheel and are produced by injection moulding or deformation.

Figure 6:
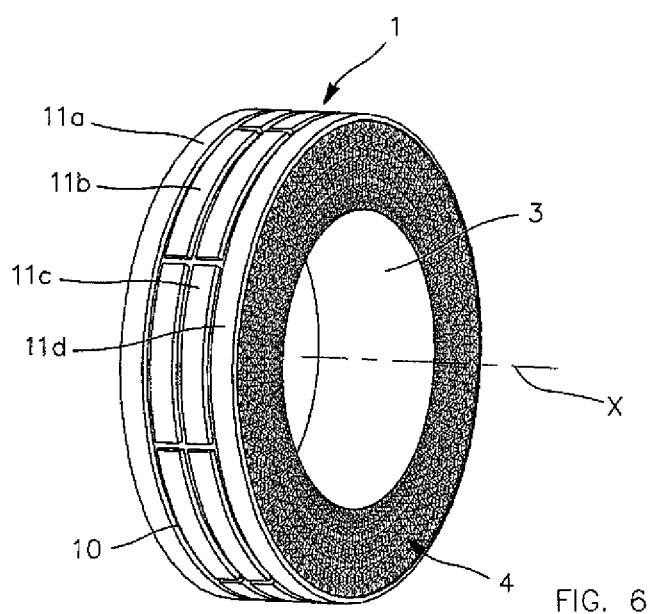
FIG. 6 is a perspective view of a tire in a third possible embodiment of the invention.

FIG. 6 shows a tire produced in this way.

More precisely, a tread 1 composed of multiple reliefs such as 11*a* and 11*b* is bonded to the outer annular band 10 covering a supporting structure 4, which is also provided with an inner annular band 3.

The inner annular band 3 allows this supporting structure 4 to be mounted on an essentially cylindrical wheel rim or hub by a reversible connection.

Figure 7:
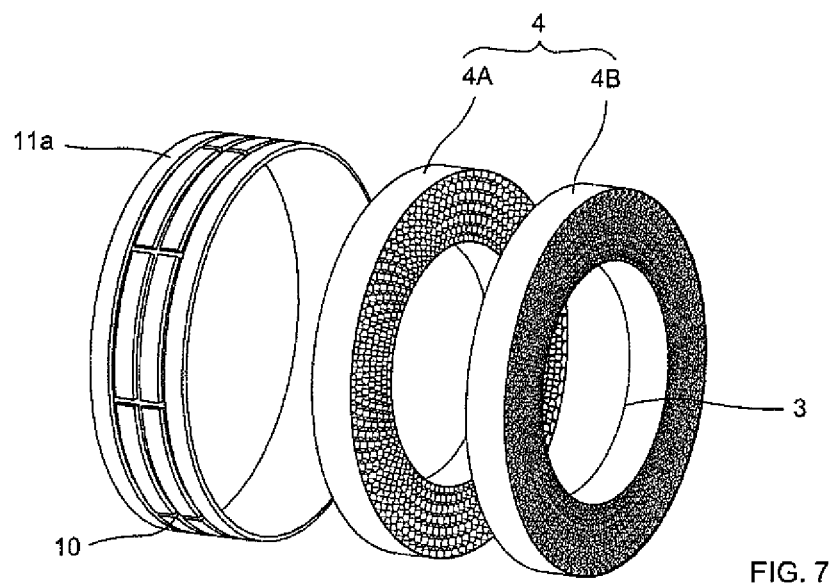
FIG. 7 is an exploded perspective view of the tire in the third possible embodiment of the invention.

FIG. 7 illustrates a first example showing the assembly of the supporting structure.

The reliefs such as 11*a* of the tread 1 are bonded to the outer annular band 10, and the latter is assembled to the supporting structure 4.

As a variant, the reliefs, such as 11*a*, may be bonded directly to the supporting structure 4, in which case the function of the outer annular band 10 will be integrated with that of this supporting structure.

The supporting structure 4 is made up of two essentially identical shells 4A and 4B which can be made by injection moulding in a relatively simple mould, with a demoulding direction parallel to the axis of rotation of the tire.

Figure 8:
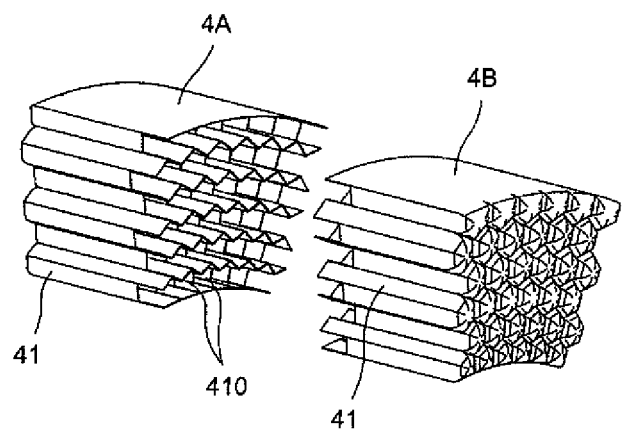
FIG. 8 is an exploded partial perspective view of the supporting structure of the tire in the third possible embodiment of the invention.

FIG. 8 shows the construction of the shells 4A and 4B by enlarging one sector.

Each of these shells consists of a plurality of honeycomb cells disposed transversely and approximately parallel to the axis of rotation of the tire.

Each of these cells is closed at the end adjoining the outside of the tire by a wall whose shape is as nearly as possible a hemisphere in order to make the supporting structure 4 airtight while allowing it to undergo large deformations, especially radially.

Walls of cells situated at the same distance from the tire axis are approximately the same thickness, although on the other hand this thickness may decrease with increasing distance from the axis.

On the inward side of the tire, the approximately radial walls of the cells terminate preferably short of the approximately circumferential walls in order to allow the latter to form circumferential bridging rings which can be nested one inside the other.

One possible nesting embodiment (FIGS. 7 and 8) is to make two shells in the same mould, and nest a hot shell with a cold shell, the bridging rings of the cold shell, being diametrically smaller at the moment of nesting, and shrink fitting with the rings of the other shell as the temperatures of the two shells equalize.

In addition to shrink fitting, the bridging rings may be adhesively bonded or welded.

The resulting supporting structure 4 comprises channels whose width is equal to the width of the bridging rings which equalize the pressure of each of the layers of cells which may or may not communicate in turn with each other.

Figure 9:
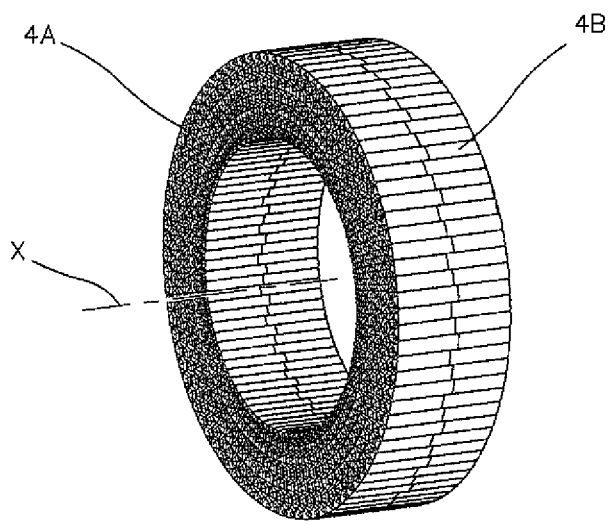
FIG. 9 is a perspective view of the supporting structure of a tire made in accordance with a variant of the third embodiment of the invention.
Figure 10:
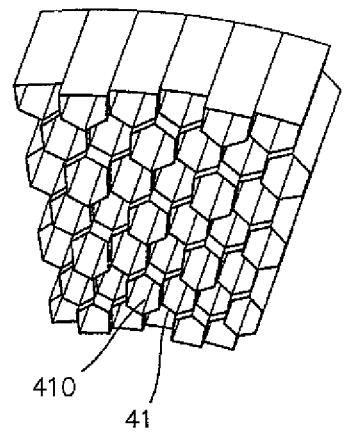
FIG. 10 is an enlarged view of a detail of the supporting structure illustrated in FIG. 9.
Figure 11:
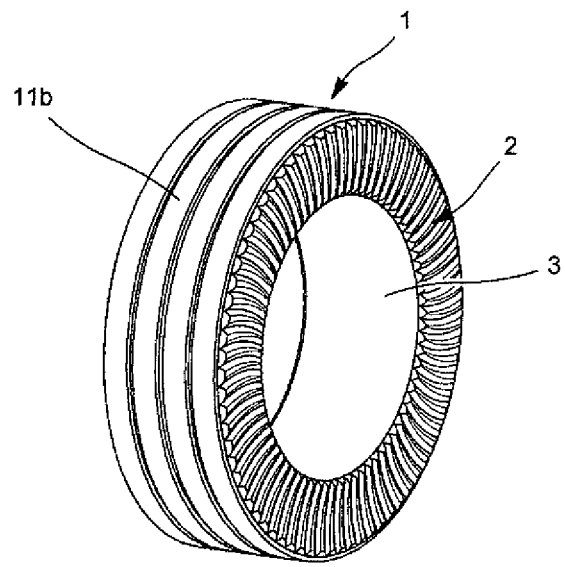
FIG. 11 is a perspective view of a tire in a fourth possible embodiment of the invention.

FIGS. 9 and 10 show a second example of how the shells 4A and 4B may be assembled, in which each cell of a shell nests with the opposing cell on the other shell. This allows the cells to be individually airtight, or allows the passage of air or gas from one cell to the other with a limited speed of flow.

FIGS. 11 to 15 show another embodiment of a tire in accordance with the invention.

In this embodiment, the inner annular band 3 is connected to the radial partition walls 40 and to the sidewalls 2, the partition walls and sidewalls in turn being connected to the outer annular band 10 which carries the tread 1.

The connection between the inner annular band 3 and the sidewalls 2 on the one hand, and that between the sidewalls 2 and the outer annular band 10 is airtight.

The sidewalls 2, the inner annular band 3 and the outer annular band 10 are also airtight in order to contain the internal pressure of the tire.

If the radial partition walls 40 are themselves airtight, they can, with airtight connections, break up the annular volume V of the tire into independent compartments, one between each pair of partition walls, producing in effect a cellular carcass.

In this case, provided there are a large number of compartments, a puncture to one of these compartments will not be enough to affect the correct operation of the tire, which cannot suffer any sudden total loss of pressure.

In a variant, a small orifice can be made in the radial partition walls 10 so that there is communication between the compartments, allowing single-point control of the pressure (for inflating and monitoring the pressure if using conventional materials). The size of the orifice is small enough to prevent any sudden total loss of tire pressure in the event of accidental tearing of one or a few compartments.

The partition walls 40 are approximately radial and are tensioned laterally by the action of the inflation pressure on the sidewalls 2, which generates lateral forces F1 on the partition walls, as shown by the lateral arrows in FIG. 14.

The profile of the sidewalls 2 in a meridional section through the tire is then no longer necessarily the so-called "convex equilibrium" profile as in the prior art, but they can adopt many other shapes such as a concave shape for example. This advantage can be exploited to provide different profiles on the two sidewalls 2.

The partition walls 40 can also be tensioned radially by the inflation pressure acting on the outer annular band 10, in the absence of any load on the tire.

Figure 15:
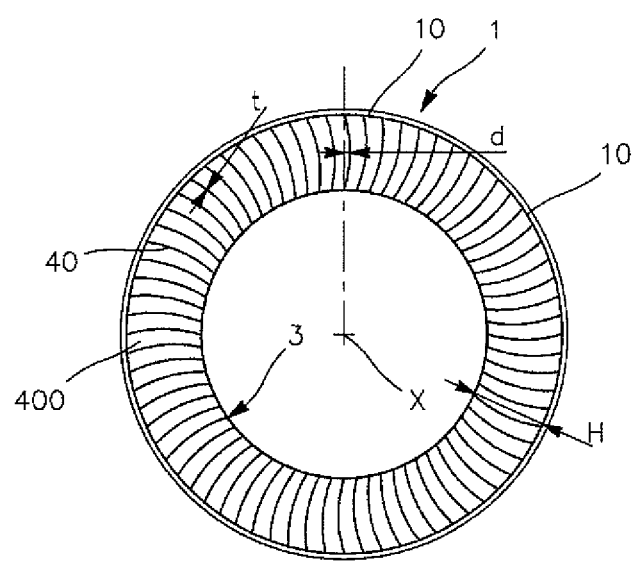
FIG. 15 is a cross section through the supporting structure of the tire illustrated in FIG. 13.

For this purpose, the partition walls 40 are essentially planar and radial, the dimension d, or "deflection", illustrated in FIG. 15 being zero, and the stiffness modulus of the material of the partition walls 40 being much greater than that of the outer annular band 10.

The outer annular band 10 has a tendency to increase in diameter, which has the effect of pulling on the radial partition walls 40 and generating radial forces Fr, illustrated by the vertical arrows in FIG. 14, on the partition walls 40.

In a variant, in the absence of any load applied to the tire, all of the action of the inflation pressure on the outer annular band 10 can be absorbed by this annular band. This annular band 10 must then be very stiff in the direction of its circumference and therefore practically inextensible, while the radial forces Fr acting on the partition walls 40 are effectively zero.

The partition walls 40, for their part, may be made slightly curved with the dimension d in FIG. 15 having a typical value of no more than a few millimeters in the case of a passenger car tire.

The partition walls 40 are preferably numerous, very thin and slender (FIG. 15). For a passenger car tire 205/55 R16, an advantageous construction uses 120 partition walls with a radial height H of approximately 110 mm, and a thickness t of approximately 0.1 mm in the case of steel, and approximately 0.3 mm in the case of polyamide 6/6.

The partition walls 40 can only therefore, to a first approximation, transmit tensile forces (arrows in FIG. 14) or by reduction of initially tensile forces.

The outer annular band 10 is thin and flexible in order to conform efficiently to the ground in the contact patch, thus optimizing the footprint.

On the other hand, on the opposite side from the contact patch, it is fully circular, being stiffened by the inflation pressure, and can support the vertical load acting through the hub or wheel, via the inner annular band 4 and the partition walls 40 carrying the radial forces generated by bearing the load.

To a first approximation, ignoring the load-supporting role of the sidewalls 2, the hub or wheel of the vehicle is as it were suspended from the partition walls 40 and from the outer annular band 10. The effect of this is to minimize the extra load on the suspension and the tire caused by encountering protruding obstacles.

A high degree of lateral stiffness and drift stiffness is obtained by the stiffening due to the action of the inflation pressure on the outer annular band 10 and on the partition walls 40, which are all subjected to the lateral forces F1 (FIG. 14) and to the action of the load on the partition walls 40 subjected to the radial forces Fr on the opposite side from the contact patch.

The partition walls 40 thus combine several functions, namely, in particular, load bearing, reinforcing the foam, providing lateral support to the sidewalls 2 when at their shortest, preventing these sidewalls from bulging outwards under the action of the inflation pressure, and absorbing the drift forces, all of which means that the material of these partition walls is made full use of.

The torque (whether driving or braking) is transmitted partly by the sidewalls 2, and partly by the slope of the partition walls 40, which move away from their radial position in response to a slight rotation of the inner annular band 3 compared with the outer annular band 10.

The tire according to the invention is preferably made by extruding in one piece the outer annular band 10, the inner annular band 3 and the radial partition walls 40 in a material such as polyamide or polyester, and then overmoulding the sidewalls 2 and the tread 1.

In particular, the annular bands 3 and 10, the partition walls 40 and the internal walls 41 can be made of a composite material composed of fibres embedded in a resin matrix.

Regardless of the particular embodiment, the difference between the inflation pressure inside the supporting structure 4 and the atmospheric pressure outside of the tire stiffens the walls 41 or the partition walls 40 and means that this structure can be made with very thin walls or partition walls.

The invention claimed is:

1. A tire comprising:
an envelope comprising rubber, the envelope defining an airtight internal annular volume subjected to an inflation pressure during operation, the envelope comprising two sidewalls and a crown joined to each of the two sidewalls, the crown comprising a tread and an outer annular band;

at least one inner annular band arranged concentrically inside of and at a distance from the crown; and a pressurized supporting structure at least partially inside the annular volume, the supporting structure connecting the outer annular band and the inner annular band, the supporting structure comprising a plurality of radial partition walls dividing the annular volume into a plurality of compartments that follow one another in a direction tangential to the tire, the two sidewalls being connected to or integral with the supporting structure;

wherein the inner annular band and outer annular band are airtight and the two sidewalls each comprise airtight lateral walls joined in an airtight manner to the outer and inner annular bands to define said airtight annular volume; and wherein the lateral walls comprise a closed-cell foam bonded to the inner annular band, the outer annular band, and the radial partition walls.

2. A tire comprising:

an envelope comprising rubber, the envelope defining an airtight internal annular volume subjected to an inflation pressure during operation, the envelope comprising two sidewalls and a crown joined to each of the two sidewalls, the crown comprising a tread and an outer annular band;

at least one inner annular band arranged concentrically inside of and at a distance from the crown; and a pressurized supporting structure at least partially inside the internal volume, the supporting structure connecting the outer annular band and the inner annular band, the supporting structure comprising a plurality of supporting walls dividing the annular volume into a plurality of compartments or cells, the two sidewalls being connected to or integral with the supporting structure;

wherein:

the inner annular band and outer annular band are airtight and the two sidewalls each comprise lateral walls joined in an airtight manner to the inner annular band and to the outer annular band to define said airtight annular volume;

the lateral walls have a nearly hemispherical outward shape configured to withstand the inflation pressure while allowing for tire deflection; and the supporting walls are configured to prevent modification in geometry of the sidewalls by the inflation pressure.

* * * * *